Sept. 15, 1964   R. K. SMYTH ETAL   3,149,270
SELF-ADAPTING SERVO PARAMETER CONTROL MEANS
Filed Nov. 21, 1960   3 Sheets-Sheet 3

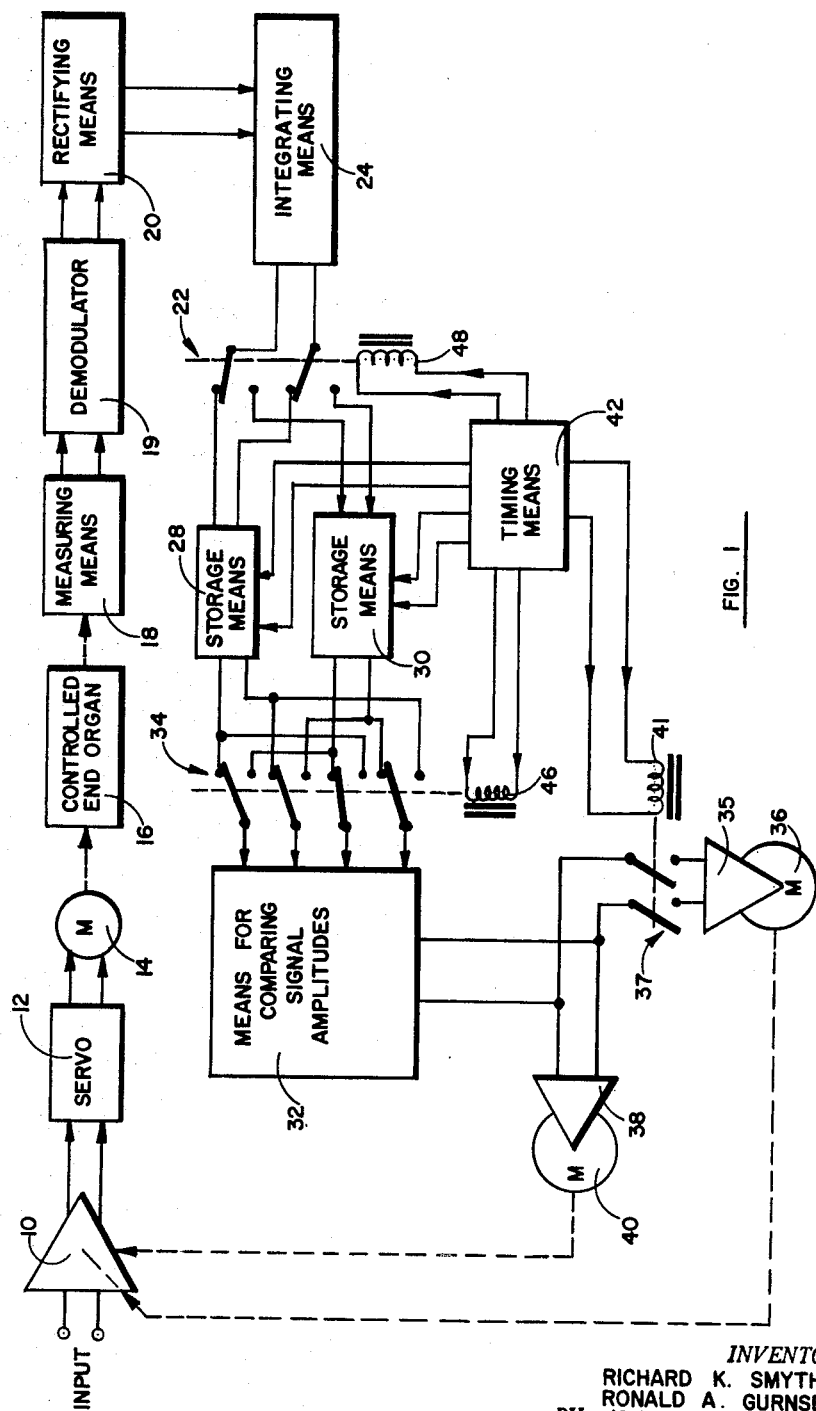

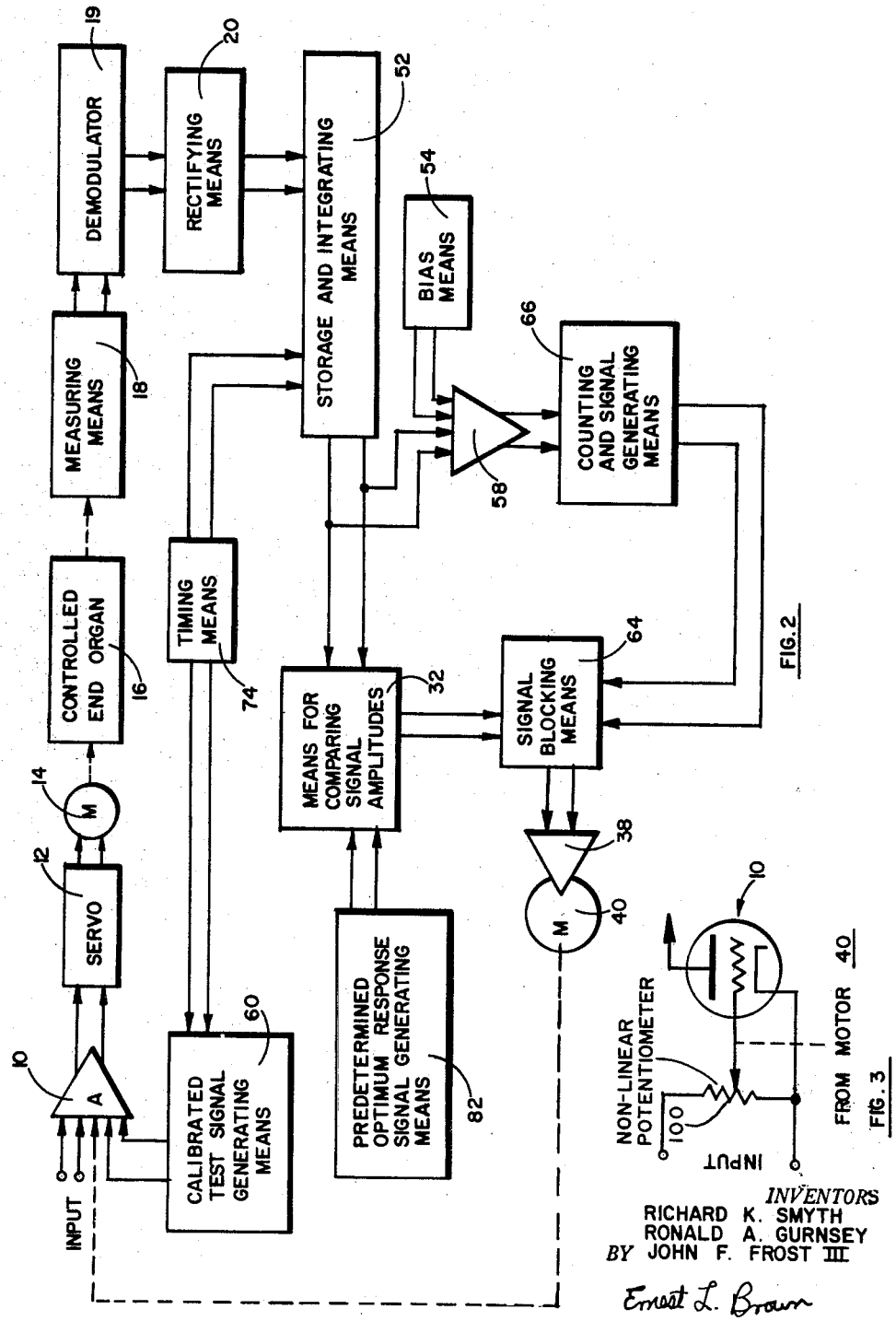

INVENTORS
RICHARD K. SMYTH
RONALD A. GURNSEY
BY JOHN F. FROST III

Ernest L. Brown
ATTORNEY

United States Patent Office 3,149,270
Patented Sept. 15, 1964

3,149,270
SELF-ADAPTING SERVO PARAMETER
CONTROL MEANS
Richard K. Smyth, Downey, and Ronald A. Gurnsey and
John F. Frost III, San Francisco, Calif., assignors to
North American Aviation, Inc.
Filed Nov. 21, 1960, Ser. No. 70,816
18 Claims. (Cl. 318—28)

This invention pertains to means for controlling the gain, the time constant, the phase, or other parameter of a servo system to an optimum value, and more particularly to a means for comparing the response of a servo system over a predetermined time period and for controlling the parameters of said servo system to cause said response to behave in a predetermined manner.

In prior known self-adaptive controlled servo systems it is customary to measure the response of the system, to compare the response of the system to a predetermined optimum response, and to change the parameters of the servo system as a function of the instantaneous variation between the response of the servo system and the optimum response.

In accordance with one embodiment of this invention, it is desirable to integrate the absolute value of the response of the servo system over a predetermined optimum time period, to compare the amplitude of the integrated response with the amplitude of a predetermined signal, and to control the servo system as a function of the variation between the compared values. The predetermined signal against which the value of the integrated response is compared may, alternatively, be a measure of the integral of the absolute value of the response of the servo system over a previous time period or it may be a predetermined fixed value which corresponds to the optimum response of the servo system.

The device of this invention uses an integral of the absolute value of the response of the servo system as a measure of comparison to prevent transients and instantaneous fluctuations in response from causing a significant change in the computed parameter control.

It is therefore an object of this invention to adapt a servo system to its optimum response by varying the parameters of the servo system in a manner to vary an integral of the absolute value of a predetermined, measured response of the servo system.

It is yet another object of this invention to vary the parameters of a servo system in response to the variation between the integral of the absolute value of the response of the servo system, measured over a predetermined time period, and a predetermined number.

It is also an object of this invention to vary the parameters of a servo system in response to the relative magnitudes of the integral of the absolute value of the response of the servo system over consecutive equal periods of time.

It is also an object of this invention to utilize a self-adaptive servo loop which is self-adjusting with respect to its direction of change of the controlling parameters of a servo loop.

These and other objects of the invention will become apparent from the following description taken in connection with the accompanying drawings, in which FIG. 1 is a block diagram of one embodiment of this invention;

FIG. 2 is a block diagram of a second embodiment of this invention;

FIG. 3 is a schematic diagram showing a typical means for varying a parameter of a servo system;

Figures 4, 5:
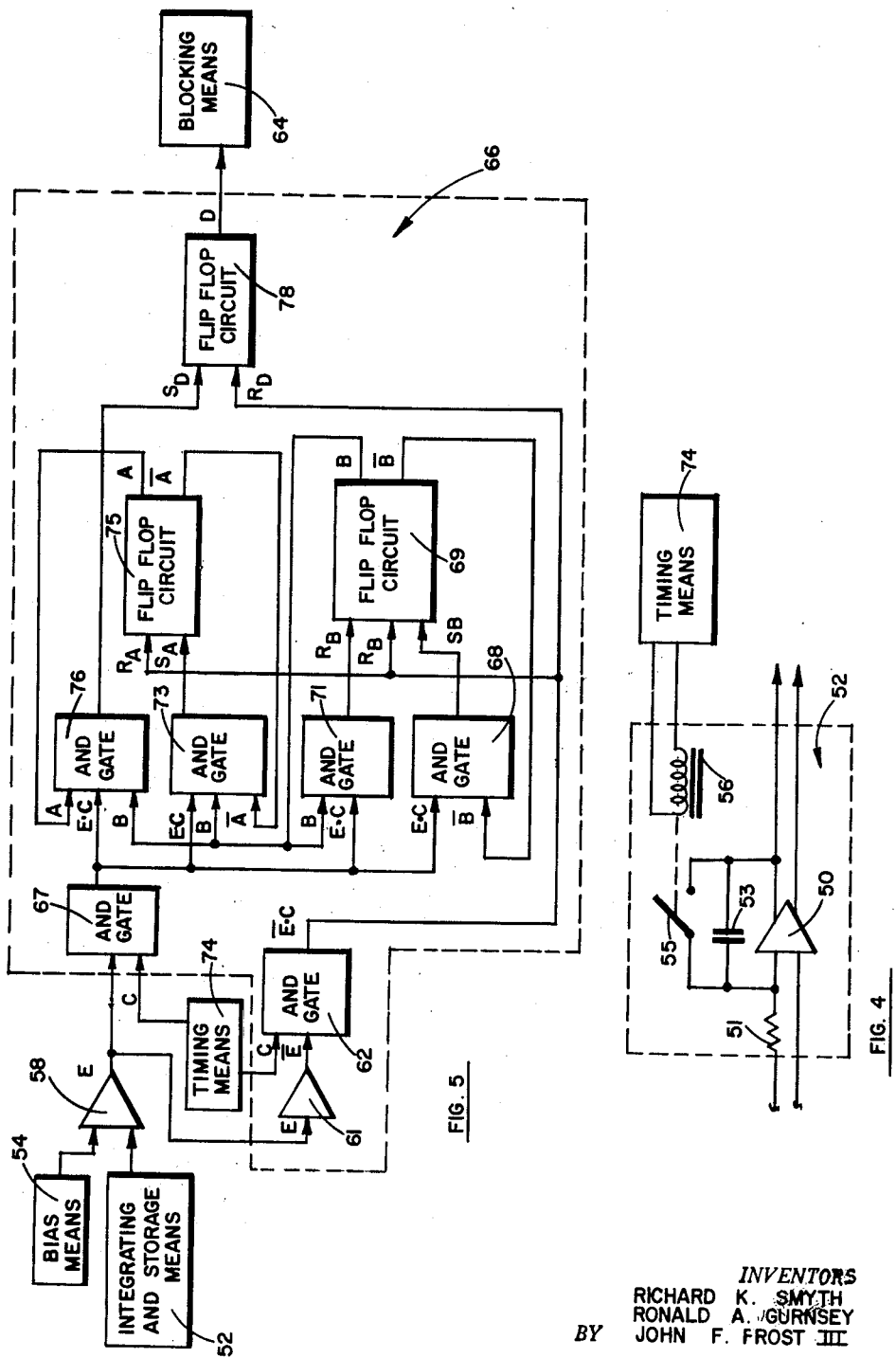
FIG. 4 is a schematic diagram of a typical combined integrating and storing circuit.
FIG. 5 is a single line schematic of a logical system for counting and generating a signal after a predetermined number of counts.

In FIGS. 1 and 2, the input to the servo system is connected to amplifier 10 which has therein means for varying the parameters of the servo system. For example, amplifier 10 may utilize a potentiometer, shown at 100 in FIG. 3, a variable inductor, or a variable capacitor. The remaining elements of the servo system, connected to amplifier 10, is represented by block 12 which may be any of the conventional kinds of servos with simple or multiple loops, and the like. Motor 14 is electrically connected to the output of servo 12 and is mechanically connected to the controlled end organ 16.

It is to be understood that other actuators may be substituted for motor 14. For example, a hydraulic or pneumatic actuator which is controlled selectively by the servo system of block 12 could be substituted for motor 14.

The controlled end organ may be any kind of device or structure, the control of which is the object of the servo system. For example, the controlled end organ might be a control surface of an aircraft, an aircraft throttle, an oil refinery mixture control, and the like.

Measuring means 18 is connected to measure the performance of end organ 16. It may be connected to the end organ as shown by the dotted lines connecting blocks 16 and 18 or it may be a measuring means which measures some factor which is controlled by the end organ 16. For example, measuring means 18 might be a doppler radar which is utilized to measure the velocity of an aircraft while the controlled end organ 16 might be the throttle of the aircraft. It is immediately evident that the velocity of the aircraft is a measure of the performance of the servo system which controls the throttle of the aircraft. Another example: the controlled end organ might be the controls of a vehicle and the measuring means might be an accelerometer, with the purpose of controlling the acceleration of the vehicle. Measuring means 18 could, alternatively include computations means. For example, measuring means 18 might include a pitot tube, a thermometer, and a computer to generate a signal which is a measure of Mach number of a supporting aircraft.

Measuring means 18 is connected through demodulator 19 and rectifying means 20 to generate a constant polarity signal which is a measure of the absolute value of the response measured by measuring means 18. If the signal generated by measuring means 18 is not alternating, the modulator 19 is eliminated and measuring means 18 is connected directly to the input of rectifying means 20. If measuring means 18 generates a D.-C. voltage, rectifying means is only necessary if the D.-C. signal generated by measuring means 18 is not of a constant polarity. In the event that the D.-C. voltage of the output of measuring means 18 is of a polarity which reverses with the sense of the measured quantity, rectifying means 20 needs to be only a switch to maintain a constant polarity at the output of rectifying means 20.

In FIG. 1, the electrical output of rectifying means 20 is connected to the input of integrating means 24. Storage means 28 and 30 are alternately connected by switching means 22 to the output of integrating means 24 to store the respective integrated signals.

Integrating means 24 may be any kind of integrator, for example, an amplifier and motor. Another example of an integrating means 24 is an integrating gyroscope. Still another example of an integrating means 24 is shown in FIG. 4. The circuit which is shown in FIG. 4 may, alternatively, be utilized as a combined integrating and storage device. If it is desired to utilize the circuit of FIG. 4, the block 24 of FIG. 1 may be eliminated and by-passed and a device such as shown in FIG. 4 may be utilized at the position of storage means 28 and 30.

Storage means 28 and 30 may be any kind of storage means known in the art. For example, storage means 28 and 30 could be a simple condenser. Storage means 28 and 30 might be a storage tube, magnetic core, or a drum. As mentioned above, FIG. 4 shows one storage means, combined with an integrating means.

The outputs of storage means 28 and of storage means 30 are connected through four pole, double throw switching means 34 to be connected alternately to the input of a means for comparing signal amplitudes 32.

Means 32 for comparing signal amplitudes may be a subtraction circuit, a simple relay or voltage opposition circuit, or any other signal comparison circuit. One example of a comparison means is a saturated amplifier which is biased to cut-off to operate in a switching mode. Still another signal comparison circuit—for example—is a Schmitt trigger. A typical Schmitt trigger is shown and described on pages 276, 277, and 278 of "Recurrent Electrical Transients," by Von Tersch and Swago, Prentice-Hall, 1953. Signal comparison circuits may, alternatively, generate signals which are a measure of the magnitude and the sense of the difference between two input signals, a measure of the magnitude only of a pair of input signals, or a measure of the sense only of a pair of input signals. It is important in the device of this invention that the output of means 32 have a polarity which is a measure of which pair of input terminals receives a signal of greater magnitude. In one embodiment of this invention the output signal of means 32 is of a constant predetermined magnitude and of a sense which is dependent upon the pair of input terminals which has the greater magnitude of signal. A Schmitt trigger will generate the desired kind of output. Also a constant D.-C. voltage source, connected through a polarity reversing relay whose position is responsive to the relative magnitude of the input signals can be utilized. In a second embodiment of this invention, a difference amplifier can be used to generate an output signal whose amplitude is a function of the difference between compared signals. This function may be linear or non-linear, continuous or stepped.

Each switching means used in this invention could be, for example, an electronic device, a solid state device, or a magnetic device.

Signal comparing means 32 is connected to amplifier 38 to drive motor 40 mechanically to control a parameter varying device, such as —for example—potentiometer 100 of amplifier 10.

It is to be noted that signal comparing means 32 may be connected by its output to additional amplifiers, such as amplifier 35, to control a plurality of motors, such as motor 36 which in turn controls, either in sequence or simultaneously a plurality of parameters within amplifier 10. If it is desired to time-sequence the operation of amplifier 35, switching means 37 may be utilized.

Timing means 42 is adapted to generate timing signals which are connected to relay winding 48 of switching means 22, to winding 46 of switching means 34 and to winding 41 of switching means 37 to control the position of the movable contacts. Sequential reset signals from timing means 42 are connected to storage means 28 and 30.

One parameter control technique is shown in FIG. 3 wherein the gain of amplifier 10 is controlled by potentiometer 100 connected across the input to the servo system.

When a potentiometer is used to adjust the gain of amplifier 10, a potentiometer is desired with a distributed resistance in which equal increments of motion of the slider select unequal elements of resistance. For example, as the gain of amplifier 10 approaches zero, it is desirable to adjust the gain more finely than would be desirable when amplifier 10 is operating at a high gain. To this end, a potentiometer with an exponential resistance distribution or the like, is desirable. Another desirable resistance distribution causes equal mechanical increments of potentiometer 100 to change the resistance by an equal percentage of the resistance measured prior to the move of the potentiometer arm. Similarly, a variable conductor or capacitor with a non-linear distribution of capacitance, inductance, or reactance is desirable to vary the time constant or phase angle of the servo system.

In FIG. 2, a calibrated test signal generating means 60 is connected to the input of amplifier 10. In the preferred embodiment of this invention, in accordance with FIG. 2, test signal generating means 60 generates either pulses or square wave trains.

The output of rectifying means 20 is connected through integrating and storage means 52 to the input of means for comparing signal amplitudes 32. Alternatively, the integrating and storage means could be separate devices, as described above in connection with FIG. 1.

A calibrated signal which is a measure of predetermined optimum value of the integral of the magnitude of the response of the servo system is generated by predetermined optimum response signal generating means 82, the output of which is connected to the input of means for comparing signal amplitude 32.

A typical means for comparing signal amplitude 32 has been described above in connection with FIG. 1.

The input of amplifier 38 is connected, through signal blocking means 64, to the output of comparing means 32. Amplifier 38 drives motor 40, which is connected to a parameter varying means such as—for example—potentiometer 100 in amplifier 10. It is to be stressed that the output of signal blocking means 64 could be connected, either simultaneously or in timed sequence, to a plurality of amplifiers such as—for example—amplifier 35 of FIG. 1 to control a plurality of parameter varying means within amplifier 10.

The output of storage and integrating means 52 is connected, together with the output of bias means 54 to the input of amplifier 58 to generate a signal at the output of amplifier 58 which is a measure of the difference between the signal in means 52 and the amplitude of the signal generated by bias means 54. Amplifier 58 is preferably a switching amplifier which is adapted to generate a signal at the output thereof whenever the amplitude of the signal at the output of storage and integrating means 52 exceeds the amplitude of the signal generated by bias means 54. Such an amplifier may—for example—utilize a saturated amplifier which is operating in its switching mode, i.e., the signals at the input to amplifier 58 are scaled so that the difference between the two voltages at the input of amplifier 58 blocks the amplifier until the voltage at the output of means 52 exceeds by a predetermined amount the voltage at the output of bias means 54.

The signals at the output of amplifier 58 are connected to counting or signal generating means 66.

One example, which utilizes a logical circuit, of counting and signal generating means 66 is shown in FIG. 5. Means 66 may—for example—alternatively be a stepping switch which is stepped when signals of one polarity are received and which is reset by a timing pulse if no signals are received which coincide with the timing pulse. When a predetermined number of pulses are received from amplifier 58 without an intervening time period in which no pulses are received, means 66 generates an output pulse which is connected to control signal blocking or gating means 64.

Signal blocking or gating means 64 may be—for example—a relay whose position is controlled by signals from counting and signal generating means 66.

Timing means 74 is connected to storage means 52 to reset said storage means at predetermined equal intervals of time. Timing means 74 is also connected to test signal generating means 60 to initiate time test pulses or square waves. Timing means 74 is connected to counting and signal generating means 66 to reset means 66 if a signal is not received from amplifier 58.

Referring to FIG. 3, potentiometer 100 is connected across the input of amplifier 10 to control the amplitude of the signal applied between the grid and cathode of the first amplifier tube. The position of the movable arm of potentiometer 100 is controlled by the position of motor 40.

FIG. 4 shows a typical combination integrating and storage means 52. One input and output terminal are common. The other input terminal is connected through resistance means 51 to the input of amplifier 50. Amplifier 50 has extremely high gain. Condenser 53 bridges amplifier 50 and is connected between the output and input terminals thereof. The signal which appears across condenser 53 is a measure of the integral of the signal which appears at the input of device 52. Switching means 55 is connected across condenser 53 to reset device 52. Switch 55 is controlled in response to winding 56 which is connected to be controlled by timing means 74.

FIG. 5 shows a single line type diagram of a logical counting and signal generating means 66. This particular counting and signal generating means is adapted to generate an output pulse. In the device of FIG. 5, an output pulse is generated whenever timing means 74 and amplifier 58 generates four consecutive time-coincident pulses. It is to be stressed that the number of predetermined time-coincident pulses, i.e., four, is not significant, but is shown by way of example only. For each particular servo system it is to be expected that a different number of predetermined pulses will be chosen.

Typical examples of and-gates, or-gates, and flip-flop circuits may be found by referring to "Logical Design of Digital Computers" by Montgomery Phister, Jr., published by John Wiley in 1957. And-gates may be found on page 22, or-gates may be found on page 23, and flip-flop circuits may be found on page 26.

In the logical device of FIG. 5, the symbol S labels the set terminal of each flip-flop circuit, and the symbol R labels the reset terminal of each flip-flop circuit. The presence of a pulse at the output of amplifier 58 is represented by the symbol E. The presence of a timing pulse at the output of timing means 74 is represented by the symbol C. The symbols A and $\overline{A}$ represent the presence of signals at the two alternative outputs of flip-flop circuit 75. The symbols B and $\overline{B}$ represent the presence of signals at the alternate output terminals of flip-flop circuit 69. The symbol D indicates the presence of a signal at the useable output of flip-flop circuit 78. The signal E is connected from the output of amplifier 58 to the input of inverting amplifier 61 which is designed to generate a signal $\overline{E}$ whenever a signal E does not appear. The input to and-gate 62 is connected to receive signal $\overline{E}$ from amplifier 61 and signal C from timing means 74 to generate a signal whenever E and C are simultaneously present. The $\overline{E} \cdot C$ signal at the output of and-gate 62 is connected to the reset terminals of flip-flop circuits 75, 69 and 78 to cause the $\overline{A}$ and $\overline{B}$ signals to be present and to cause the D signal not to be present. And-gate 67 is connected to receive signal E from amplifier 58 and C from timing means 74 to generate a signal whenever the timing of E and C coincide. The E·C signals are connected to the inputs of and-gates 76, 73, 71, and 68. And-gate 68 is connected by its input to receive signal $\overline{B}$. And-gate 71 is connected to receive signal B. And-gate 73 is connected to receive signals B and $\overline{A}$. And-gate 76 is connected to receive signals A and B. The output of and-gate 76 is connected to the set terminal of flip-flop circuit 78. The output of and-gate 73 is connected to the set terminal of flip-flop circuit 75. The output of and-gate 71 is connected to the reset terminal of flip-flop circuit 69. The output terminal of and-gate 68 is connected to the set terminal of flip-flop circuit 69. When flip-flop circuit 78 is set, a signal D is connected to control blocking means 64.

In operation, an iput signal is received into amplifier 10 and channeled through servo 12 and motor 14 to control end organ 16. The response of end organ 16 is measured by measuring means 18. If the signal from measuring means 18 is alternating, it is demodulated by demodulator 19 and is rectified by rectifying means 20 to cause the signal at the output terminals thereof to be of constant polarity but of a magnitude which is proportional to the magnitude of the signal of means 18.

In the device of FIG. 1, the signal is integrated by integrating means 24. The integrated signal is alternately stored by storage means 28 or storage means 30 in accordance with the position of switching means 22.

In the shown embodiment, timing means 42 causes the switching contacts of switching means 22 to dwell in each throw position for a predetermined time period. The chosen time period is determined for the particular servo system by testing the system under different operating conditions. For example, in one use of this invention wherein the servo controlled the rudder of an aircraft and the measuring means 18 measured the lateral acceleration of the aircraft, and an optimum dwell period of two seconds was used.

The absolute value of the response signal is integrated over one time period, and the integrated signal is deposited for storage in the storage means 28. During the next timed period, the integrated response is deposited in storage means 30. The stored signals in the storage means 28 and storage means 30 are compared by means for comparing signal amplitudes 32. Switching means 34 is synchronized, by timing means 42, with switching means 22 to cause the later signal to be applied to a predetermined pair of input terminals of means 32 and the older signal to be applied to the other pair of input terminals.

Timed erasing pulses are delivered from timing means 42 to storage means 28 and 30 immediately prior to their connection to integrating means 24.

The difference between the signals at the inputs to comparing means 32 generates either a positive or negative voltage, depending upon whether the signal integrated over the later timed period is larger or smaller than the signal integrated over the earlier timed period. The direction of motion of motors 40 and 36 and their associated parameter control within amplifier 10 is determined by the polarity of the voltage output of comparing means 32.

For example, if it is predetermined to cause the signal which appears on storage means 28 and 30 to approach a minimum value, if the signal which is stored on storage means 30 (assuming means 30 was last connected to integrating means 24) is less than the signal which is stored by storage means 28, the polarity of the signal applied to the amplifier 38 is of a predetermined polarity to cause motor 40 to operate the parameter varying mechanism within amplifier 10 in a direction whereby the future signals stored by storage means 28 and 30 will be of decreasing magnitude.

If, however, it is predetermined to cause the signal which is stored on storage means 28 or 30 to increase, comparing means 32 is arranged (for example, by reversing its input terminals) to cause the polarity of the signal applied to the input terminals of amplifier 38 to be of opposite polarity from that previously realized to cause motor 40 to operate in the opposite sense from that previously described.

If it is desired to operate motor 36 simultaneously with the operation of motor 40, switching means 37 may be omitted and by-passed. If, however, it is desired to operate motor 36 after the operation of motor 40, timing means 42 sends a pulse to winding 41 to close switch 37 at this predetermined time. Thereafter, motor 36 is caused to vary its associated parameter controlling means within amplifier 10 in a predetermined manner in accordance with the direction of rotation of motor 36.

Immediately after the control of amplifier 38 and motor 40, timing means 42 channels an erasing pulse to storage means 28 to prepare storage means 28 to receive a new signal.

Timing means 42 then causes relay 48 to move the movable arms of switching means 22 to connect integrating means 24 to storage means 28 to store the signal integrated over the next timing period. The signals which are stored on storage means 28 and 30 are then compared by comparing means 32. If it is predetermined to decrease the signal upon storage means 28 and 30, if storage means 28 now has a signal stored therein which is less than the signal stored in storage means 30, the polarity of the signal applied to amplifiers 38 and 35 causes the motors 40 and 36 to turn in the appropriate direction to vary the parameters in amplifier 10 to cause the future signals applied to storage means 28 and 30 to decrease. If it is predetermined to maximize the signals applied to storage means 28 and 30, the signal out of means 32 causes the motors 40 and 36 to turn in a direction opposite to that previously described.

As soon as the signal appearing at the output of storage means 30 has achieved its useful function, timing means 42 resets the storage means 30 to receive a signal from integrating means 24 during the next integrating interval.

Thus, timing means 42 continuously alternates switching means 22 and 34 to control motors 40 and 36 in steps, thereby to alter the parameter controlling mechanism within amplifier 10.

In operation of the device of FIG. 2, a test pulse is generated in generating means 60 at predetermined time intervals. The test pulse generates a response which is measured by measuring means 18, demodulated by demodulating means 19 and rectified by rectifying means 20. The signal is next channeled through integrating and storage means 52 where it is integrated over the timed interval. The integrated signal is compared, in means for comparing signal amplitudes 32, to a reference signal generated by response signal generating means 82. If the signal at the output of storage means 52 is greater in magnitude than the signal of reference signal generating means 82, a signal of predetermined polarity is channeled from comparing means 32 to amplifier 38 to control motor 40 to vary the parameter of varying mechanism 10 in a direction to reduce the signal which will, in succeeding pulses, appear at the output of storage means 52.

Timing means 74 then erases the output of integrating and storage means 52 which causes means 52 to integrate the magnitude of the response signal over the next timed interval. The new integrated signal is then compared to the amplitude of reference signal generating means 82 to control motor 40 in response to the difference between the compared signals.

When an input is received by amplifier 10 the response usually exceeds in amplitude the response which occurs due to pulses from signal generating means 60.

To incapacitate the parameter control system to prevent servo control signal responses from varying the system parameters, a signal blocking means 64 is inserted into the adaptive loop. Means 64, for example, may be a relay controlled switch or a blocking amplifier.

When the signal at the output of integrating and storage means 52 exceeds the value of the signal of bias means 54, amplifier 58 generates—for example—a positive pulse which is channeled to counting means 66. When the signal at the output of means 52 is less than the value of the signal of bias means 54, amplifier 58 generates—for example—no pulse. Timing means 74 sends a pulse to counting or signal generating means 66 at the end of every timed interval over which the signal is integrated. If counting means 66 receives a positive signal for a predetermined number of timed periods it generates a pulse which actuates signal blocking means 64 to disconnect the control of amplifier 38. If counting or signal generating means 66 receives a pulse from timing means 74 and does not simultaneously receive a pulse from amplifier 58, counting and signal generating means 66 is reset to restart its counting. The operation of a typical logical counting means is described below in connection with the description of FIG. 5.

In FIG. 3, the magnitude of an input signal is scaled down in response to the position of the movable arm of potentiometer 100. The reduction of the signal between the grid and cathode of the tube of amplifying means 10 thereby reduces the gain of amplifying means 10.

In the device of FIG. 4, the output voltage of the integrator is equal to the gain of amplifier 50 times the voltage applied to the input of amplifier 50. By making the gain of amplifier 50 very high the voltage at the input to amplifier 50 is reduced substantially to zero. Thus, the entire output voltage of the integrator appears across condenser 53. By Kirchoff's current law, the sum of the current flowing into the junction between condenser 53 and resistor 51 is equal to zero. Thus, the input of voltage of the integrator divided by the resistance of resistor 51 plus the capacitance of condenser 53 times the time derivative of the output voltage equals zero. Integrating both sides of this equation, the output voltage is equal to the integral of the input voltage of the integrator divided by the resistance of resistor 51 and the capacitance of capacitor 53. When it is desired to reset the integrator 52, timing means 74 actuates relay 56 which closes switch 55 to discharge capacitor 53.

In FIG. 5, if the signal of integrating or storage means 52 is less than the signal of bias means 54, no signal appears at E. With no signal at E, a signal appears at $\overline{E}$. As long as a signal $\overline{E}$ is present, each time timing means 74 generates a signal C, and gate 62 generates a signal $\overline{E} \cdot C$ which continuously resets flip-flop circuits 75, 69, and 78 to cause signals $\overline{A}$ and $\overline{B}$ to appear.

When integrating or storage means generates a signal which is greater than the signal of bias means 54, a signal E appears which extinguishes signal $\overline{E}$. When timing means 74 generates a pulse C, if E is present, and-gate 67 generates a signal E·C, which on the first pulse causes and gate 68 to generate a signal to set flip-flop circuit 69 to extinguish signal $\overline{B}$ and to generate a signal B. When the second consecutive pulse E·C appears, and-gates 71 and 73 generate signals to reset flip-flop circuit 69 and to set flip-flop circuit 75 to extinguish signals B and $\overline{A}$ and to generate signals $\overline{B}$ and A. When the third consecutive pulse E·C is received, a signal appears at the output of and-gate 68 to set flip-flop circuit 69 to generate a signal B and to extinguish $\overline{B}$. The fourth consecutive signal E·C causes a signal at the output terminals of and-gate 76 to set flip-flop circuit 78 to generate a signal D which actuates blocking means 64.

Thus, the device of this invention integrates the response of a servo system over a predetermined optimum period of time and either compares the amplitude of the integral over consecutive equal periods of time or compares the amplitude of the integral of the response to a calibrated input over a predetermined period of time to a known predetermined reference amplitude. With such an arrangement instantaneous fluctuations in the response of the servo system are smoothed to cause the servo system to assume its optimum parameter values. Further, a continuous monitor of the performance of the servo system is achieved.

Although the invention has been described and illustrated in detail, it is to be understood that the same is by way of illustration and example only and is not to be taken by way of limitation, the spirit and scope of this invention being limited only by the terms of the appended claims.

We claim:

1. In combination: a servo system, including means for adjusting at least one of the characteristics of the gain, the time constant and the phase of said servo system; measuring means connected to measure the response of said servo system and to generate a signal which is a measure of the magnitude of said response; integrating means connected to said measuring means to generate a signal which is a measure of the integral of the magnitude of the signal generated by said measuring means; means for generating a signal to be compared with the amplitude of the signal of said integrating means; means for comparing signal amplitudes connected to said last named means for generating a signal and to said integrating means to compare the amplitudes of the signals thereof to generate a control signal whose sense depends upon which one of said compared signals is larger; timing means adapted to generate timing signals and connected to control the time duration of integration by said integrating means and for resetting said integrating means; and control means connected to the output of said means for comparing signal amplitudes to be controlled thereby in response to said control signal; said control means being connected to said means for adjusting at least one of the characteristics of said servo systems.

2. A device as recited in claim 1 in which said measuring means comprises: means for generating a signal which is a measure both of the magnitude and the sense of said response, and rectifying means connected to rectify said signal to generate a signal with a constant sense whose magnitude is a measure of the absolute value of said response.

3. A device as recited in claim 2 in which said means for generating a signal which is a measure both of the magnitude and sense of said response is a means for generating an alternating signal and further comprising demodulating means connected between said means for generating a signal and said rectifying means.

4. A device as recited in claim 1 in which said integrating means comprises: resistive means, amplifying means in series with said resistive means; and capacitative means connected in parallel with said amplifying means.

5. A device as recited in claim 4 and further comprising means for selectively discharging said capacitive means.

6. A device as recited in claim 1 wherein said means for generating a signal to be compared with the amplitude of the signal of said integrating means comprises: second integrating means for storing integrated signals from a previous predetermined time period.

7. A device as recited in claim 1 in which said means for generating a signal to be compared with the amplitude of the signal stored in said integrating means comprises: a constant voltage source having a predetermined voltage and further comprising: calibrated test signal generating means connected to generate test signals at the input to said servo system and connected to be controlled by said timing means.

8. A device as recited in claim 7 and further comprising: counting means connected to said integrating means to count the number of consecutive times the signal in said integrating means exceeds a predetermined amplitude; and signal blocking means connected to block the control of said said motor means when the signal in said integrating means exceeds a predetermined amplitude a predetermined number of times and to unblock said control when the signal in said integrating means at the end of a predetermined time interval is less than said predetermined value, said counting means being connected to said timing means to be controlled thereby.

9. A device as recited in claim 8 in which said counting means comprises: signal generating means connected to said integrating means to generate a signal when the signal in said integrating means exceeds a predetermined amplitude; and a logical means connected to said timing means and said integrating means for generating a signal when timing pulses received from said timing means coincide a predetermined number of consecutive times with the presence of a signal from said last named signal generating means, said logical means extinguishing its output signal if a timing pulse arrives in the absence of a signal from said last named signal generating means.

10. A device as recited in claim 1 wherein said means for adjusting at least one of the characteristics of the gain, time constant and phase in said servo system include a non-linear potentiometer.

11. A device as recited in claim 1 in which said means for comparing signal amplitudes is a means for generating a control signal whose amplitude is a measure of the difference between said compared signals and whose sense depends upon which one of said compared signals is larger.

12. A device as recited in claim 11 and further comprising storage means connected to store the signal generated by said integrating means; said timing means being connected to said storage means to reset said storage means in predetermined time sequence.

13. A device as recited in claim 1 and further comprising storage means connected to store the signal generated by said integrating means; said timing means being connected to said storage means to reset said storage means in predetermined time sequence.

14. For use in a servo system which has means for adjusting at least one of the gain and time constant and phase characteristics of said system, the subcombination comprising: measuring means for generating a signal which is a measure of the magnitude of the response of a servo system; integrating means connected to said measuring means to generate a signal which is a measure of the integral of the magnitude of the signal generated by said measuring means; means for generating a signal to be compared with the amplitude of the signal stored in said integrating means; means for comparing signal amplitudes connected to said last named means for generating a signal and to said integrating means to compare the amplitudes of the signals thereof to generate control signals whose sense depends upon which one of said compared signals is larger; timing means for generating timing signals and connected to control the time duration of integrating by said integrating means and for resetting said integrating means; and control means connected to be responsive to the output of said means for comparing signal amplitudes, said control means being connected to said means for varying a said characteristic of said servo system.

15. A device as recited in claim 14 in which said means for comparing signal amplitudes is a means for generating a control signal whose amplitude is a measure of the difference between said compared signals and whose sense depends upon which one of said compared signals is larger.

16. A device as recited in claim 14 and further comprising storage means connected to store the signal generated by said integrating means; said storage means being connected to said timing means to be reset thereby in predetermined time sequence.

17. A control system including means for optimizing the performance of said system comprising: a servo controller having adjustable response characteristics including gain, time constant and phase characteristics; first means operatively connected to said servo controller for adjusting at least one of said characteristics of said servo controller; second means responsive to said system for providing at least first and second signals indicative of system performance at first and second times respectively; and comparison means responsively connected to said second means for providing a servo adjustment signal indicative of the difference between said first and second signals; said first means being responsive to said adjustment signal.

18. A control system comprising: a servo controller having at least one adjustable response characteristic; a calibrated signal source operatively connected to an input of said controller; first means responsive to said system for providing a performance signal indicative of system performance in response to said calibrated signal source; signal storage means responsive to said first means for separately storing successive samples of said performance signal; a performance criterion signal source; comparison means responsively connected to said performance criterion signal source and said signal storage means; logic means responsive to said signal storage means for providing a signal indicative of the sense of the difference between two successive stored signals; signal means responsive to said comparison means and said logic means for providing a servo adjustment signal; and servo adjusting means responsive to said servo adjustment signal for adjusting said one response characteristic of said servo controller in such a sense as to reduce the difference between said performance and said performance criterion signal source.

References Cited in the file of this patent
UNITED STATES PATENTS

| | | |
|---|---|---|
| 2,537,427 | Seid et al. | Jan. 9, 1951 |
| 2,649,563 | Meredith | Aug. 18, 1953 |
| 2,862,167 | Curry | Nov. 25, 1958 |
| 2,880,384 | Surtees | Mar. 31, 1959 |
| 2,940,026 | Roque | June 7, 1960 |
| 2,941,139 | Marx | June 14, 1960 |
| 2,990,504 | White | June 27, 1961 |
| 3,008,077 | Osder et al. | Nov. 7, 1961 |